UNITED STATES PATENT OFFICE.

PAUL BLAUBACH, OF BREMEN, GERMANY.

PROCESS OF MANUFACTURING LINOLEUM.

948,572.  Specification of Letters Patent.  Patented Feb. 8, 1910.

No Drawing.  Application filed November 18, 1908.  Serial No. 463,293.

*To all whom it may concern:*

Be it known that I, PAUL BLAUBACH, a citizen of the German Empire, and a resident of Bremen, in the State of Bremen, Germany, have invented certain new and useful Improvements in Processes of Manufacturing Linoleum, of which the following is a specification.

My invention relates to improvements in processes of manufacturing linoleum, and the object of the improvements is to provide a process, whereby a linoleum is produced which is more flexible than the linoleum manufactured by the processes heretofore in use, and which is not subject to creeping, that is to spreading or shrinking when laid out on the floor. And for this purpose, I add some fibrous material to the materials heretofore used in the manufacture of linoleum, which materials consist of finely ground cork or wood, coloring materials, and a binding medium, or linoleum cement, such as boiled, oxidized linseed oil, resin and kauri, and I thoroughly mingle the said materials and the fibrous material. I have discovered, that by thus adding a fibrous material to the materials heretofore used in the process of manufacturing linoleum the above stated properties of the product are obtained.

A suitable method of performing the new process consists in thoroughly mingling the aforesaid substances heretofore used in the manufacture of linoleum with jute or other suitable fibrous materials, and pressing the mass obtained upon canvas.

A product of high properties is obtained, when cutting linoleum manufactured by the ordinary process into pieces, disintegrating the same together with the canvas so as to form a granular mass, and pressing the same, by means of calenders or hydraulic presses, upon a new layer of canvas. By this process, the fibrous material is thoroughly intermingled with and bound to the linoleum.

I claim:

The herein described process of manufacturing linoleum which consists in mingling ground cork, coloring material, boiled linseed oil, resin and kauri, pressing the mass so obtained upon a fibrous material, disintegrating the product so obtained so as to form a granular mass, and pressing the same upon a layer of canvas, substantially as described.

In testimony whereof I hereunto affix my signature in the presence of two witnesses.

PAUL BLAUBACH.

Witnesses:
 FREDERICK HOYERMANN,
 CARL ULZMANN.